G. E. HIGGINS.
SHOCK ABSORBER.
APPLICATION FILED OCT. 23, 1920.
1,404,956.
Patented Jan. 31, 1922.
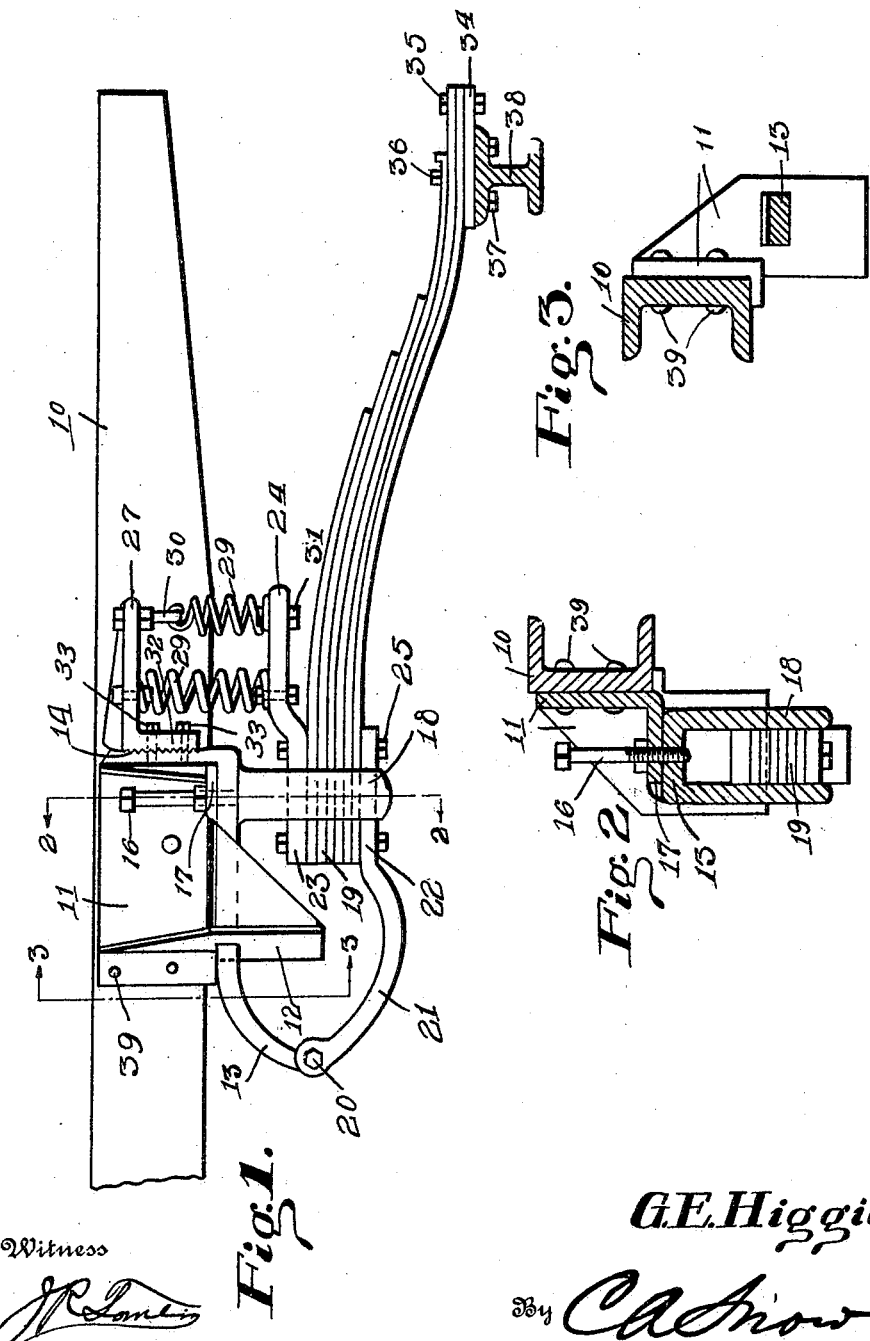
Inventor
G. E. Higgins.
By C. A. Snow & Co.
Attorneys
Witness

UNITED STATES PATENT OFFICE.

GEORGE E. HIGGINS, OF MODESTO, CALIFORNIA.

SHOCK ABSORBER.

1,404,956.  Specification of Letters Patent.  Patented Jan. 31, 1922.

Application filed October 23, 1920. Serial No. 418,924.

*To all whom it may concern:*

Be it known that I, GEORGE E. HIGGINS, a citizen of the United States, residing at Modesto, in the county of Stanislaus and State of California, have invented a new and useful Shock Absorber, of which the following is a specification.

The present invention relates to spring construction, and more particularly to the construction of springs of the cantilever type commonly employed in connection with motor vehicles.

The primary object of the invention is to provide means in connection with the cantilever springs, to restrict movement of the leaves of the springs with relation to the chassis of the vehicle, thus enhancing the riding qualities of the motor vehicle equipped with the device, and reducing the lateral strain usually directed to the springs, to a minimum.

A further object of the invention is to provide a device of this character which may be readily and easily applied to the usual motor vehicle construction, thereby eliminating the necessity of altering the construction of the vehicle to affect the attachment of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a side elevational view of a spring device constructed in accordance with the present invention, showing the same as applied to one of the side rails of the chassis of an automobile.

Figure 2 illustrates a sectional view taken on line 2—2 of Figure 1.

Figure 3 illustrates a sectional view taken on the line 3—3 of Figure 1.

Referring to the drawing in detail, the reference character 10 designates one end of one of the side rails of the chassis of the usual automobile construction, to which is attached the bracket 11, forming a part of the present invention, and through the medium of which the springs proper, are connected to the chassis of the vehicle.

This bracket is provided with depending flanges indicated at 12, disposed in spaced relation with each other, the space between the flanges being equal to the width of the curved arm 13, forming a part of the construction, and as shown the rear extremity of this arm is serrated as at 14, for purposes to be hereinafter more fully described.

The arm 13 is secured to the bracket 11 by means of the bolts 15 and 16 which pass through suitable openings provided in the bracket and arm, the bolt 16 however being shown as extending through openings provided in the laterally extending flanges 17, the lower ends thereof passing through openings in the arm 13.

Formed integrally with the arm 13 are the depending arms 18 which extend an appreciable distance below the arm 13 and embrace portions of the leaf springs indicated at 19, so that lateral movement of the springs, at this point, with relation to the chassis, will be absolutely prevented.

Hingedly connected to the arm 13, as by means of the bolt 20, is a curved arm 21 which has a relatively straight portion 22 forming a seat for the leaf springs 19, which are clamped between the portion 22 and the relatively straight portion 23 of the arm 24, which is offset with relation to the portion 23 to lie in spaced relation with the uppermost leaf of the spring 19, to permit a movement of the spring, with relation to the arm, and eliminate any possibility of binding between the spring and arm 24.

The bolts 25 extend through the relatively straight portions 22 and 23 of the arms 21 and 24 respectively, which bolts also pass through registering openings formed in the leaves of the spring 19, the bolts 25 being provided to clamp the spring 19 therebetween. The reference character 27 designates a bracket for supporting the coiled springs 29, the upper ends of which have connection with the bracket 27 by means of the eye bolts 30, the lower ends thereof having connection with the bolts 31, in a manner to permit the tension of the springs to be regulated, according to the weight of the vehicle to which the same are applied, and it might be further stated that the spring 28 is shown as relatively small, while the spring 29 is relatively large, so that the forward spring 29 is shown relatively small, while the other spring is relatively large, so that the last mentioned spring will act to counter-act the recoil of the smaller spring when the machine is passing over relatively small irregularities in the surface over which the same is moving.

The bracket 27 is provided with a depending portion 32 which also has a serrated surface adapted to cooperate with the serrated face of the arm 13 to permit of adjustment of the bracket 27 vertically, with relation to the serrated surface of the arm 13, there being bolts 33 provided, which extend through openings in the arm 13 and a slot in the bracket 27, whereby the bracket may be moved into close engagement with the arm 13, to support the bracket in its various positions of adjustment.

A plate 34 has connection with the spring 19, as by means of the bolt 35, so that the plate may be secured to the spring 19, in a manner to prevent movement of the plate with relation to the spring, the extreme ends of the spring and plate being secured by means of the bolt 36. This plate is provided with suitable openings to accommodate the bolt 37, which passes through the axle indicated at 38, so that movement of the spring 19 with relation to the axle 38 is absolutely prevented.

It might be further stated that the structure of the bracket 11 is such as will embrace a portion of the rail 10, so that the same will be secured thereto by means of the bolts 39, which pass through the bracket and rail 10.

It is believed that in view of the foregoing disclosure, the operation of the device will be apparent, and that a detail description of the operation of the device, is unnecessary.

Having thus described the invention, what is claimed as new is:—

1. In combination with a vehicle frame and axle, a bracket secured to the frame, depending flanges forming a part of the bracket, an arm disposed between the flanges, said arm having a serrated surface, a spring member having one of its ends connected to the axle, an arm having connection with the spring, and having pivotal connection with the first mentioned arm, a bracket having a serrated face cooperating with the serrated surface of the first mentioned arm, for permitting adjustment of the bracket, and coiled springs disposed between the bracket and first mentioned spring.

2. In combination with a vehicle frame and axle, a bracket secured to the frame, a curved arm having connection with the bracket, an arm having pivotal connection with the first mentioned arm, a spring member having one end connected to the axle, and having the opposite end connected to the latter arm, an adjustable bracket having connection with the first mentioned arm, and coiled springs disposed between the bracket and first mentioned spring.

3. In combination with a vehicle frame and axle, a bracket secured to the frame, an arm carried by the bracket, depending arms forming a part of the first mentioned arm, a spring member having one end connected to the axle, and having its opposite end disposed between the depending arms, means for pivotally connecting the spring member to the first mentioned arm, and coiled springs interposed between the first mentioned spring and frame, for restricting movement of the frame with relation to the axle.

4. In combination with a vehicle frame and axle, a bracket secured to the frame, a bracket having connection with the frame, an arm rigidly connected to the bracket, and having a serrated surface, a bracket having a serrated surface cooperating with the first mentioned serrated surface, means for securing the bracket to the arm, in various positions of adjustment, a spring member having connection with the axle, means for pivotally connecting the spring member to the first mentioned arm, an arm having connection with the spring member, coiled springs disposed within the last mentioned arm and the bracket member, and means for connecting the springs to the bracket member to permit adjustment thereof.

In testimony that I claim the foregoing as my own, I have hereto affixed my signature in the presence of two witnesses.

GEORGE E. HIGGINS.

Witnesses:
GRACE VELIE,
GEORGE R. BLACKWOOD.